United States Patent Office 2,865,907
Patented Dec. 23, 1958

2,865,907

PROCESS OF PREPARING SULFURIZED-PHOSPHORUS SULFIDE-OLEFIN LUBRICANT ADDITIVE

Guy M. Verley, Harvey, Ill., assignor to Sinclair Refining Company, New York, N. Y., a corporation of Maine No Drawing. Application August 28, 1957
Serial No. 680,651

4 Claims. (Cl. 260—139)

This invention relates to lubricating oils and to improved additives for lubricating oils which inhibit oxidation of the oils during use. More particularly, this invention relates to a method for preparing lubricating additives by the reaction of phosphorus pentasulfide, sulfur and olefins to afford products which are suitable for use as anti-oxidants in lubricating oils.

A sequence in the development of lubricating oil additives has been the utilization of various phosphorus and sulfur-containing compounds to impart oxidation inhibiting properties to hydrocarbon oils. For example, it has been suggested that a useful class of lubricating oil additives may be prepared by reacting various bicyclic terpenes with sulfur and phosphorus pentasulfide at low temperatures of about 250 to 260° F. The exothermic reaction proceeds spontaneously upon slight heating and in most instances the reaction products have been further reacted with aliphatic or aromatic compounds such as a phenol or alcohol. Other complex reaction products of this type are the materials obtained by reacting an olefin or olefin polymer with phosphorus pentasulfide at high temperatures above 340° F., as described in U. S. Patent 2,316,087, or the sulfurized phosphorus sulfide-olefin reaction product described in U. S. Patent No. 2,424,402 wherein the product is employed as a flotation agent to effect concentration of sulfide ores. In phosphorus sulfide reactions involving olefins, as for example in U. S. Patent 2,424,402, lengthy reaction times and high temperatures above 340° F. are utilized to effect reaction between the olefin and phosphorus sulfide and any sulfur lost during the reaction in the form of hydrogen sulfide is compensated for by the presence of a sulfurization agent such as sulfur or sulfur chloride.

In accordance with the present invention I have discovered an effective method for preparing lubricating oil additives comprising the oil-soluble reaction product of phosphorus pentasulfide, sulfur and aliphatic olefins containing 12 to 18 carbon atoms. In a particular aspect the invention is directed to the method of preparing improved lubricating oil additives comprising the above reaction products by means of specified molar ratios of reactants whereby the sulfur catalyzes or facilitates the addition of the olefins to phosphorus pentasulfide in a reaction which proceeds rapidly and within a range of temperatures where, in the absence of sulfur, the phosphorus pentasulfide and olefins do not react. By direct reaction of specified mole ratios of phosphorus pentasulfide, sulfur and aliphatic olefins under comparatively low temperature conditions the sulfur combines with the $P_2S_5$-olefin reaction product to effect good yields of a complex material having a high sulfur content which appears to correspond to a non-polymeric cyclic tetrathiophosphoric acid of the structure:

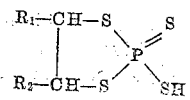

wherein

is the aliphatic olefin radical.

In carrying out the method of the present invention, mole ratios of from about 2 to 4 moles of olefin and about .6 to 3 moles of sulfur per mole of phosphorus pentasulfide are reacted at temperatures from about 250° F. to 325° F., preferably 275 to 310° F., for a period of about one to three hours. The reaction between the phosphorus pentasulfide and olefin is substantially complete within three hours but to increase the yield of oil-soluble reaction product, longer periods of heating may be employed. Although the reaction of phosphorus pentasulfide and olefins can be accomplished with difficulty at temperatures above 350° F., resulting in low yields of a complex mixture having poor oil solubility, by employing mole ratios of the reactants within the temperature range recited, the sulfur not only acts as a catalyst but also increases the combined sulfur content of the final product. In the method of preparing the additive, the sulfur may be used in the elemental form or in the combined form. In the combined form the olefin is sulfurized prior to reaction with the phosphorus sulfide and only that portion of sulfur which is active is utilized to catalyze the reaction, i. e. the amount of sulfur in excess of the ratio of one atom of sulfur per mole of olefin.

The sulfurized phosphorus sulfide-olefin reaction product above described is acidic and may be neutralized by percolation through petroleum adsorbents, i. e. fuller's earth, or by treating the reaction product with a metal-containing basic reagent such as hydroxide, carbonate, or an oxide of an alkaline earth metal or an alkali metal, i. e. potassium hydroxide or sodium hydroxide, or with an oxide of a divalent metal such as zinc, cadmium or magnesium. In the preferred embodiment, neutralization is effected with a basic reagent containing a metal constituent of zinc or barium whereby the final product is characterized by the retention of the metal constituent. Alternatively, the acidic product may be first refluxed with a primary alcohol to obtain the ester and then neutralized with the basic material containing the metal constituent. Neutralization may be carried out as above described, however, residual acidity of the reaction product may be reduced prior to neutralization by treatment with an alcohol or phenol which additionally provides a more oil-soluble additive material for improved engine performance. Phenols and alcohols such as t-octyl phenol and 2-ethylhexanol can be reacted with the acidic reaction product in amounts ranging from 5 to 30%, and at a temperature of from 200 to 350° F. As shown hereinafter, the phosphorus sulfide-olefin reaction products treated in this manner prior to neutralization provide excellent lubricating oil compositions which will reduce engine wear and be effective in preventing the formation of sludge, varnish, and carbon.

The olefins employed in preparing the additives of this invention are aliphatic mono-olefins containing 12 to 18 carbon atoms which do not contain a quaternary carbon atom and a methyl group adjacent the olefinic structure. Such olefins preferably include those derived from the low molecular weight mono-olefins such as butylene, isobutylene, propylene and ethylene, or a hydrocarbon mixture containing isobutylene and butylene as can be obtained from petroleum gases produced in the cracking of petroleum oils in the manufacture of gasoline. Examples of olefins employed as reactants in this invention are triisobutylene, dodecene-1 and dimerized heptene.

The invention and its advantages will be illustrated by the following examples showing specific embodiments thereof. The examples are illustrative only and are not intended as defining the breadth of the invention.

EXAMPLE I

Two moles of triisobutylene, 2 moles of sulfur and ¾ mole of $P_2S_5$ were heated in a reaction flask for two hours at 275° to 280° F. with stirring. 64 grams of crystalline organic material were precipitated by extending the product with 5 volumes of n-hexane. The crystalline product was benzene soluble and melted at 225° to 235° C. An analysis of this material showed:

|  | Percent |
|---|---|
| Phosphorus | 11.19 |
| Sulfur | 28.8 |
| Carbon | 50.74 |
| Hydrogen | 8.59 |

Topping of the hexane-soluble fraction at reduced pressure yielded 75 grams of triisobutylene and 369 grams of a brown resin having a paraffinic oil solubility, a phosphorus content of 9.8% and a sulfur content of 24.4%.

In contrast with Example I, two moles of triisobutylene and ¾ mole of $P_2S_5$ were heated with vigorous stirring and the temperature maintained at the refluxing point of triisobutylene (344° F.) for 3 hours. Analysis of the mixture showed that $P_2S_5$ remained in suspension and did not react with the olefin under these conditions. Hence the presence of sulfur catalyzes the reaction of olefins and $P_2S_5$ to effect a rapid reaction within a range of temperatures where $P_2S_5$ and olefins alone do not react.

EXAMPLE II

One mole of dodecene-1 ½ mole of sulfur, and ¼ mole of $P_2S_5$ were added to 240 grams of base oil and the reactants heated with vigorous stirring. At 260° F. the mixture changed color by sulfur dissolution and at 300° F. an exothermic reaction began with a rapid increase of temperature to 330° F. The heating was stopped and in 15 minutes the reaction had subsided whereupon a temperature of 300° F. was maintained for 3 hours until all sulfur and $P_2S_5$ had dissolved. Percolation of 325 grams of the product through an 8-foot column charged with a chromatographic grade of fuller's earth gave the following cuts:

A. Oil, eluted by hexane, 226 g.
B. Dodecene monosulfide, eluted by $CCl_4$, 43 g.
C. Phosphorus containing material, eluted by methanol, 54 g.

An analysis of cut (C) showed:

|  | Percent |
|---|---|
| Carbon | 41.6 |
| Hydrogen | 7.2 |
| Phosphorus | 9.38 |
| Sulfur | 39.4 |
| Metal | 3.5 |

Previous percolation of sulfonic and dithiophosphoric acids have shown that fuller's earth neutralizes these acids with a mixture of metals (Ca, Mg, Zn, Al, etc.) having an average combining weight of 13, thus the metal content of cut (C) is 3.5%. The sulfate ash content of cut (C) was 17.54%.

EXAMPLE III

This preparation uses a highly sulfurized olefin instead of elemental sulfur. One mole of dodecene-1 was reacted with 4 moles of sulfur at 150° C. for 12 hours. In order to remove the color bodies and unsaturates, the black reaction product was washed with commercial sulfuric acid, neutralized, washed with water, and then dried. The product obtained constituted 85% of the theoretical yield of a light golden color, viscous, sulfurized olefin having a molecular weight of 780, and a NPA color of 5+. The following reactants were then charged into a 3-neck reaction flask equipped with a stirrer and thermowell:

Dodecene-1, 1 mole
Sulfurized dodecene-1, 0.05 mole
Phosphorous pentasulfide, 0.25 mole The reactants were heated with stirring at 210° to 220° F. for two hours and all of the phosphorus pentasulfide dissolved. The product was neutralized with 10% excess of zinc oxide in the presence of 5% water and then dried and filtered. A light colored material was obtained containing: 6.38% P; 22.8% S; 1.66% Zn; acid No., ASTM Method D–974 43; molar S/P ratio 3.45.

EXAMPLE IV

The preparation of Example III was duplicated but instead of neutralizing with zinc oxide the acidic groups were esterified by refluxing with an excess of commercial hexanol for five hours. The small amount of acidic groups remaining after esterification was neutralized with zinc oxide, the excess alcohol topped and the product filtered. A light reddish yellow material was obtained which had the following analysis: 5.35% P; 18.0% S; 0.251% Zn; acid No. ASTM Method D–974 34.6; molar ratio S/P 3.25.

Both products of Examples III and IV are miscible with highly refined paraffinic oils.

EXAMPLE V 156 grams of the hexane-soluble fraction of Example I were dissolved in 500 ml. of toluene. 17 grams of zinc oxide and 10 grams of water were added with stirring and the mixture heated to the refluxing point of toluene for 1 hour. The solvent was topped, 100 grams of (150 SUS, 100° F.) paraffinic oil were added and the material was filtered to yield 320 grams of an oil-miscible product containing 4.5% phosphorus, 13.5% sulfur, and 1.76% zinc.

EXAMPLE VI 136 grams of the topped hexane-soluble fraction of Example I were dissolved in 400 ml. of toluene. 35 grams of barium oxide and 20 grams of water were added with stirring and the water was then removed by distillation of the toluene-water azeotrope. 150 grams of a 10% basic barium petroleum sulfonate in oil solution (3.6% barium, 0.82% of sulfur) were added. The toluene was distilled off and remainning material filtered to obtain 309 grams of an oil miscible product containing 16% barium, 7.8% phosphorus, and 19.8 sulfur.

EXAMPLE VII 240 grams of dimerized heptene, 22 grams of sulfur and 70 grams of $P_2S_5$ were heated with stirring at 290 to 300° F. for 2 hours until all the solids were dissolved. The heptene dimerized was afforded by reaction of butylene and propylene, and the resulting dimer contained a small amount of trimer. From the crude reaction product thus obtained, a mixed salt was made in accordance with the procedure of Example V using 156 grams of crude product, 17 grams of zinc oxide and 150 grams of the barium sulfonate solution (see Example VI). 301 grams of a light colored product were produced containing 1.4% zinc, 2.81% phosphorus, 9.17% sulfur and 1.7% barium. The barium salt made in accordance with Example VI yielded 288 grams of a light colored material containing 4% barium, 2.47% phosphorus, and 7.76% sulfur.

Table I illustrates the effectiveness of the zinc salt of the $P_2S_5$-olefin-sulfur reaction product as an additive in lubricating oils useful in preventing the development of oxidation and varnish-forming materials. In general, depending upon the particular characteristics of the oil and the intended use, the amount of additive to be incorporated in the oil will be within a range of from about 0.1 to 10%, and preferably within a range of from about 1 to 5%. Other additives, such as detergents, anti-rust agents, V. I. improvers, metal deactivators, and the like, can also be present in the lubricating oil. The following tests were made on compositions of SAE 10W motor oil. Sufficient quantities of additive and basic barium petroleum sulfonate were added to give a blended composition containing 0.09% phosphorus and 0.95% barium.

Composition, wt. percent:
Solvent refined 95 VI Mid-Continent neutral 200 SUS at 100° F. _____ 43.78
Solvent treated Mid-Continent bright stock Table I

|  | Oxygen Absorbed, ml./100 Grams of Blend, 360° F. | | | | |
|---|---|---|---|---|---|
|  | Commercial[1] SAE 10w | Example II Zn Salt | Example III Zn Salt | Example IV Zn Salt | Example V Zn Salt |
| Time Minutes: | | | | | |
| 50 | | | | | |
| 100 | 280 | 110 | 170 | 160 | 200 |
| 150 | 480 | 220 | 300 | 280 | 380 |
| 200 | 700 | 300 | 430 | 430 | 640 |
| 250 | 950 | 470 | 600 | 640 | 900 |
| 300 | 1,250 | 630 | 840 | 880 | 1,120 |
|  | 1,600 | 770 | 1,110 | 1,120 | 1,410 |
| Specification Tests: | | | | | |
| Deposit in Flask | Varnish | | Slight Varnish | Slight Varnish | Light Varnish |
| Cu-Pb Change, mgs | +1.5 | | 0.6 | 1.4 | +0.3 |
| Acid Number | 6 | | 4.50 | 1.33 | 5.01 |
|  | 3.64 | | 0.303 | 0.644 | 1.748 |

[1] The oxidation inhibitor is a zinc diheptyl dithiophosphate.

EXAMPLE VIII 10 moles of triisobutylene, 3 moles of phosphorus pentasulfide and 2 moles of sulfur were heated with stirring in a reaction flask for about three hours at a temperature of 284 to 320° F.; for two of these hours the temperature was below 310° F. The reaction between the $P_2S_5$ and sulfur was substantially complete in three hours and the resulting mixture was heated for an additional two hours during which the temperature rose to 327° F. to increase the amount of oil-soluble reaction product. In order to reduce residual acidity and make the reaction product more oil soluble, 0.5 moles of tertiary octyl phenol were added to the reaction product at 194° F. and the mixture heated for one hour at a temperature of 194 to 203° F. A small amount of material remained undissolved and about 5.5 moles of 2-ethylhexanol was added and the mixture heated at a temperature of 210 to 250° F. for a period of about four hours to make the product more oil-soluble and decrease its acidity. The mixture was filtered and the resulting liquid fraction was topped at a reduced pressure to yield 800 g. of unreacted olefin and a bottoms material which was very viscous. 404 grams of the bottoms material was dissolved in 300 g. of benzene and the benzene distilled off at a temperature of up to about 266° F. All solids were dissolved and the mixture was stirred for two hours at 266° F. Unreacted alcohol and a small amount of triisobutylene were topped off at 20 mm. Hg up to a pot temperature of 266° F. 2114 grams of product were obtained which analyzed 8.6% phosphorus, 19.2% sulfur, and which had an ASTM D-974 acid no. of 77.6.

PREPARATION OF ZINC SALT 1219 grams of the above product, 100 grams of zinc oxide and 2 ml. of water were added to 500 ml. of benzene. The mixture was stirred and heated to the temperature of benzene distillation. The benzene was topped at a pot temperature up to 198° F., and 1000 grams of a Mid-Continent neutral oil (160 SUS at 100° F.) were added as a solvent. The mixture was filtered and yielded 2237 grams of an oil-miscible liquid product which analyzed 4.68% phosphorus, 10.2% sulfur and 2.57% zinc.

In order to illustrate the effectiveness of the additives prepared in accordance with the method of my invention, a lubricating composition was formulated as follows:

120 SUS at 210° F _____ 42.90
Carbonated basic barium mahogany sulfonate concentration in mineral oil _____ 11.60
Zinc salt of Example VIII _____ 1.67
Acryloid 150[1] _____ 0.05
Silicone polymer anti-foaming agent, 10% concentration in kerosene _____ 0.002

[1] Methacrylate ester polymer wherein the ester group is predominantly a mixture of cetyl, lauryl and octyl groups and the molecular weight is 10,000 to 15,000.

The blend analyzed:
KV, SUS at 100° F _____ 515.9
Percent Ba _____ 0.51
Percent P _____ 0.076
Percent Zn _____ 0.042

As shown in Table II below, lubricating oil compositions containing the additive prepared in Example VIII exhibit excellent stability and oxidation resistance as indicated by a total varnish and sludge rating of 98 for the blend. In the test of Table II the amount of bearing corrosion expressed in milligrams loss in weight of a standard bearing was only 24 milligrams average loss per whole bearing. These data indicate that the engine was very clean and had a low bearing loss in the test.

Table II
L-4 ENGINE TEST RESULTS AT 280° F. CRANKCASE SUMP

| Varnish Rating | | Sludge Rating | |
|---|---|---|---|
| Piston Skirt | 9.5 | Rocker Arms | 9.5 |
| Rocker Cover | 10.0 | Rocker Cover | 10.0 |
| Push Rod Cover | 10.0 | Push Rod Cover | 9.5 |
| Cylinder Wall | 10.0 | Screen | 10.0 |
| Crankcase | 10.0 | Crankcase | 9.5 |
| | 49.5 | | 48.0 |

Varnish and sludge rating, 98; average bearing loss, mg./whole bearing, 24.

This application is a continuation-in-part of application Serial No. 528,825, filed August 16, 1955.

I claim:
1. In a process of preparing a mineral oil lubricant additive of a sulfurized-phosphorus sulfide-olefin reaction product, the step comprising the preparation of said reaction product by reacting in molar ratios of from about 2 to 4 moles of $C_{12}$ to $C_{18}$ aliphatic mono-olefin and about 0.6 to 3 moles of sulfur per mole of phosphorus penta- sulfide at a temperature of about 250° to 375° F.; said reaction being substantially completed in about 1 to 3 hours to obtain an oil-soluble reaction product containing substantial amounts of combined sulfur.

2. The process of claim 1 wherein the reaction product containing combined sulfur is neutralized with a basic metal-containing compound.

3. The process of claim 2 wherein the metal-containing compound is zinc oxide.

4. The process of claim 1 wherein the reaction product containing combined sulfur is refluxed with a lower alkyl alcohol and then neutralized with a basic metal-containing compound.

No references cited.